United States Patent [19]
Joannou

[11] 3,786,288
[45] Jan. 15, 1974

[54] PHONOGRAPH RECORD PLAYER TURNTABLE AND MOTOR ASSEMBLY

[76] Inventor: Constantinos J. Joannou, 2008 Dorval Ave., Ottawa, Ontario, Canada

[22] Filed: Feb. 12, 1973

[21] Appl. No.: 331,388

[52] U.S. Cl. .................................. 310/68, 274/1 E
[51] Int. Cl. .......................................... H02k 11/00
[58] Field of Search ........................ 310/68; 274/1 E

[56] References Cited

UNITED STATES PATENTS

| | | | |
|---|---|---|---|
| 1,057,344 | 3/1913 | Hayward | 274/1 E |
| 1,480,553 | 1/1924 | Hoff | 274/1 E |
| 3,569,753 | 3/1971 | Babikyan | 310/68 |
| 3,644,765 | 2/1972 | Janson | 310/68 |

*Primary Examiner*—B. Dobeck

[57] ABSTRACT

In modern phonograph record players, there are certain problems associated with turntable and motor vibrations. This invention provides a turntable bearing and motor system which has a single ball thrust bearing in the spindle and a second radial bearing which is vibration-isolated from the bearing housing and turntable by resilient material. The turntable is driven by a very slow directly coupled motor or by a conventional motor which drives the turntable via the above mentioned resilient material and thus any motor vibration is isolated from the turntable.

3 Claims, 6 Drawing Figures

SECTION A-A'

PHONOGRAPH RECORD PLAYER TURNTABLE AND MOTOR ASSEMBLY

This invention relates to a phonograph record player in which the turntable is designed to minimize rumble. Also, higher frequency motor noise is eliminated by using a low frequency synchronous direct drive motor.

The turntables of present record players are made of heavy non-magnetic materials and they are driven by motors via belts and/or pulleys. The motors used tend to introduce high frequency vibration which is picked up by the cartridge either via the turntable or via the tone arm support. Turntable vibration (rumble) is transmitted to the pick-up cartridge via the bearings of the turntable.

It is the object of my invention to eliminate or minimize turntable vibration and low frequency noise.

Another object of my invention is to eliminate motor vibrations and vibrations associated with the turntable driving mechanism.

Another object of my invention is to provide a record player having the above mentioned features with a minimum of machining required in its manufacture.

These and other objects of my invention will become more apparent in the detailed descriptions which follow.

In drawings which illustrate embodiments of my invention,

Figure 1:
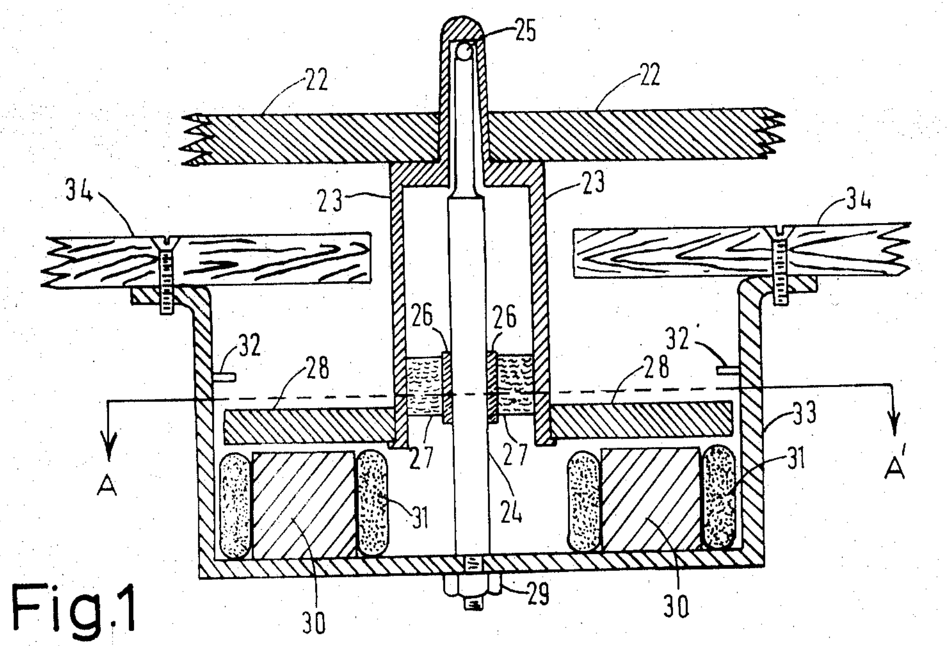
FIG. 1 shows the cross section of the turntable, spindle, bearings, bearing housing and direct drive motor arrangement.
Figure 2:
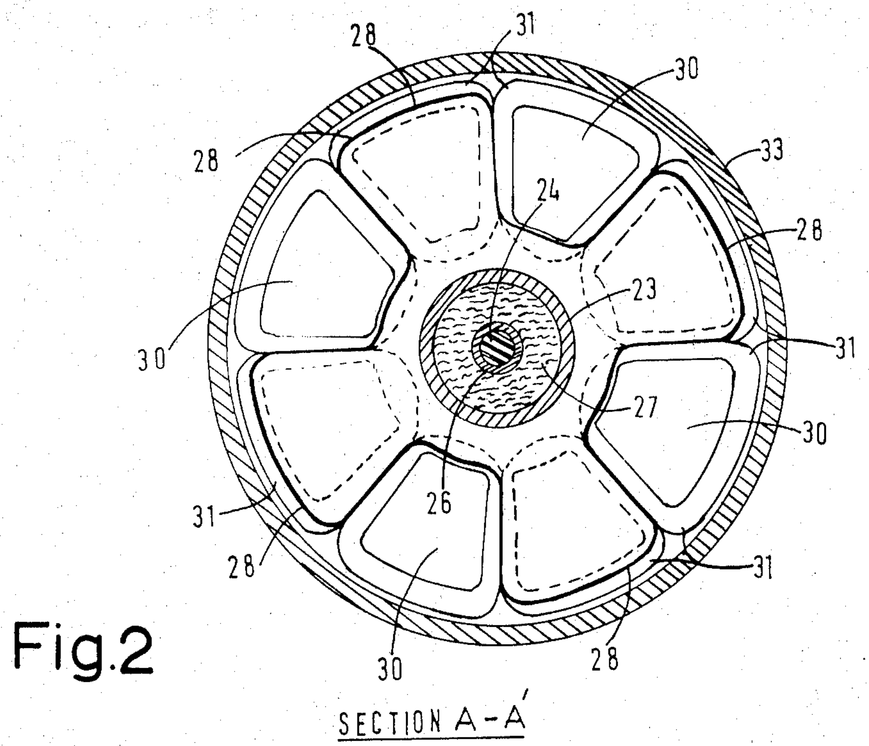
FIG. 2 is a cross sectional view of FIG. 1, showing the rotor and stator of the motor.

In FIG. 1, turntable 22 is supported by bearing housing 23. Bearing housing 23 is cylindrical and hollow inside and is supported at the top of shaft 24 via ball 25. 26 is a cylindrical bearing attached to the inside of housing 23 via a resilient sleeve 27. Sleeve 27 may be made of soft rubber, foamed plastic, foam rubber or felt. Attached to the end of housing 23 is motor rotor 28 (see also FIG. 2) which consists of a flat disk of some material, such as steel, which can be attracted by a magnet and on which salient poles are cut. The stator of the motor consists of an array of field coils (electromagnets), each consisting of a pole piece 30 and a winding 31. The array of field coils are supported by the motor casing 33. Shaft 24 is also suported by motor casing 33. The motor casing which supports the motor and the turntable, is mounted on the underside of the record player deck 34. 32 is a retainer ring attached to motor casing 33 which prevents rotor 28 and bearing housing 23 from coming off shaft 24.

Operation of the turntable bearing system is as follows: Ball 25 allows turntable 22, bearing housing 23 and rotor 28 to rotate about shaft 24 with a minimum of friction. Bearing 26 also rotates around shaft 24. The centre of gravity of the armature, bearing housing and turntable is below ball 25. In this arrangement, bearing 26 exerts a minimum of force on shaft 24, and therefore the friction between bearing 26 and shaft 24 is very small. Resilient sleeve 27 isolates any vibration generated in bearing 26 from being transmitted to the turntable.

Operation of the motor is as follows: Field coils 31 are connected in groups of two or three and are excited by a suitable two or three phase electronic voltage generator in a conventional way so as to generate a rotating magnetic field (in a similar way as in AC motors). The magnetic field generated by field coils 31 magnetizes pole pieces 30 in sequence. Pole pieces 30 attract salient poles of rotor 28 causing it to rotate in synchronism with the magnetic field. Note that in this arrangement, the stator poles attract the rotor in the downward direction producing forces on the rotor which are parallel to shaft 24 and thus do not produce any forces on bearing 26. Also, torque produced by the attraction of the rotor by stator does not produce forces on bearing 26. The speed of the turntable is adjusted by adjusting the frequency of the generator driving the motor. Since the motor described here is a synchronous one, difficulty exists in starting it from rest. This difficulty is overcome by arranging the circuitry of the generator so that when switched on, the generator voltage starts at very low frequency (close to zero) and gradually increases to its normal operating frequency. In this way, the rotor and turntable are able to catch up with the rotating magnetic field. Another way of starting the turntable is to give it an initial push by hand, or by some other mechanical system (not shown here), which starts the turntable and is coupled to the power switch.

Figure 3:
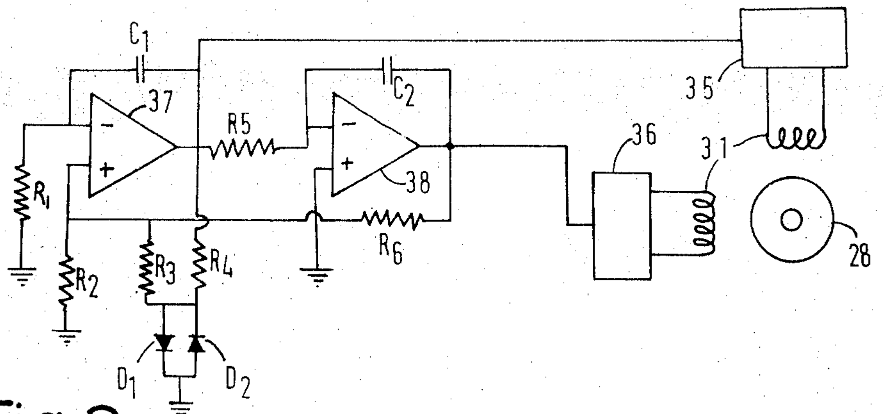
FIG. 3 is a schematic diagram of a two-phase voltage generator for driving the motor.

A two-phase low frequency voltage generator is shown schematically in FIG. 3. The generator drives the record player motor via power amplifiers 35 and 36. The generator consists of two integrating operational amplifiers 37 and 38. The amplifiers are wired as in an analog computer to solve a second order differential equation $$\ddot{x} + k_1\dot{x} + k_2x = 0$$

in which $k_1$ is negative, i.e. the coefficient of $\dot{x}$. Solution of this differential equation yields continuous oscillations, since by making $k_1$ negative, the damping of the system represented by such differential equation is negative. Therefore, the damping in the system assists the oscillations rather than retarding them. Since all the components in the generator, including the amplifiers, are linear, the negative damping represented by the loop consisting of $R_4$, $R_3$, and $R_2$, after a few oscillations will cause the amplifiers to saturate and thus produce non-sinusoidal oscillations. To prevent this from happening, diodes $D_1$ and $D_2$ are added as shown. The diodes conduct more and more in a non-linear fashion, as the output of amplifier 37 increases, thus reducing the damping loop again. In this way, the output of amplifiers 37 and 38, which are 90 degrees out of phase, reach an amplitude at which the average gain of thee damping loop is just sufficient to sustain oscillations, and then the output voltages stop increasing. The frequency of the generator can be adjusted by adjusting resistors $R_1$, $R_5$ and $R_6$ and capacitors $C_1$ and $C_2$.

Figure 4:
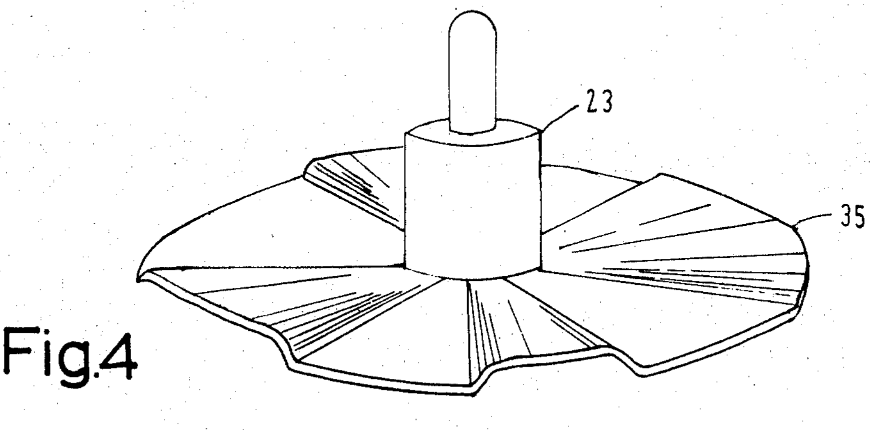
FIG. 4 is a pictorial view of an alternate rotor construction.

FIG. 4 shows pictorially an alternate way of producing salient poles on the motor rotor. A flat disk is pressed so as to form triangular indentations which alternate with flat portions.

Figure 5:
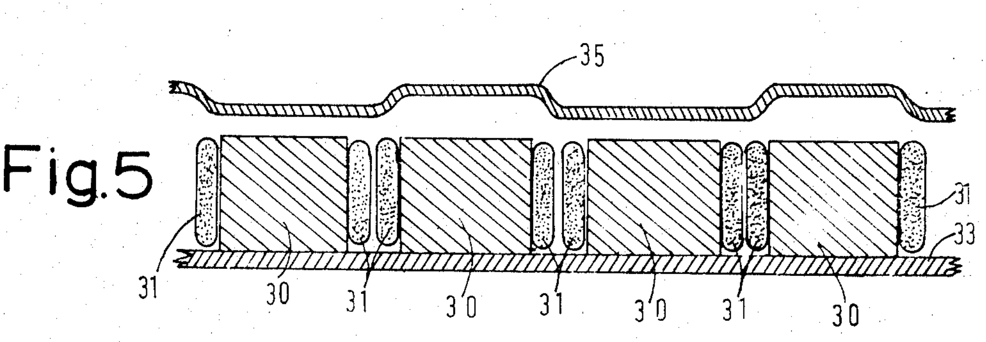
FIG. 5 shows in linear form the alternate rotor and stator of the motor.

FIG. 5 shows the armature of FIG. 4 with the stator of the motor in linear form. The advantages of this type of motor is that it provides for shorter magnetic flux path between alternate stator poles.

Figure 6:
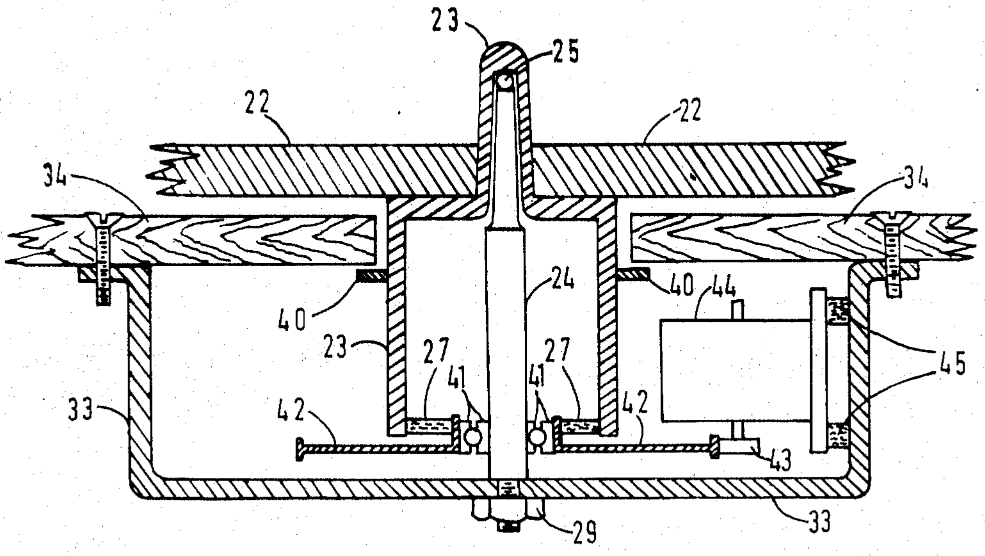
FIG. 6 shows the cross section of the turntable, spindle, bearings, bearing housing and an alternate motor drive arrangement.

FIG. 6 shows another arrangement for driving the turntable. In this arrangement, the motor 44 is not part of the turntable bearing assembly but it drives a disk 42 which is attached to ball bearing 41. Motor 44 is mounted by resilient pads 45 on casing 33 and is provided with a small wheel 43 which is in contact with disk 42, and thus the motor drives the turntable by transmitting power via disk 42, resilient sleeve 27 and bearing housing 23. In this manner, motor vibrations are isolated by resilient sleeve 27 and cannot be transmitted to the turntable. A ring 40 attached to the outside of bearing housing 23 is used to prevent the bearing housing from coming off shaft 24.

Although FIG. 6 shows a friction drive arrangement between motor 44 and disk 42, it is possible to have a belt drive arrangement where the motor is provided with a groove pulley and disk 42 is provided with a similar groove on its rim and having a belt linking the pulley and the disk.

What I claim is:

1. A phonograph record player turntable, turntable bearing and motor assembly comprising a bearing housing member, said housing member being hollow inside and protruding through the top of said turntable to form a spindle for centering records played on said turntable; said bearing housing being rotatably attached to a stationary vertical shaft by a first bearing consisting of a single spherical ball resting between the top of said vertical shaft and the extreme upper inside part of said bearing housing; said bearing housing also being rotatably supported on said vertical shaft via a second bearing, and said second bearing being attached to the lower inside part of said bearing housing by resilient material and said resilient material functioning as compliance element to prevent transverse vibrations from being transmitted from said vertical shaft to said bearing housing; a flat rotor member attached to the lower part of said bearing housing and said rotor being exposed to a rotating magnetic field said magnetic field being produced by an array of stationary electromagnets arranged underneath said rotor and thus producing forces on said rotor which are parallel to the axis of said vertical shaft said forces being balanced by reaction at said first bearing.

2. A phonograph record player turntable, turntable bearing and motor assembly as defined in claim 1 in which said rotor is made of a flat circular disk on which salient poles are formed by deformation of said disk so that alternate flat and concave segments are formed on said disk.

3. A phonograph record player turntable, turntable bearing and motor assembly as defined in claim 1 in which in lieu of said rotor and said set of electromagnets a flat disk is attached at its centre to said second bearing and said disk being made to turn by a motor and thus power being transmitted from said motor to said turntable via said disk, said resilient material and said bearing housing.

* * * * *